United States Patent [19]

Tamhankar et al.

[11] Patent Number: 5,626,033
[45] Date of Patent: May 6, 1997

[54] PROCESS FOR THE RECOVERY OF PERFLUORINATED COMPOUNDS

[75] Inventors: Satish S. Tamhankar, Scotch Plains; Paul A. Sweeney, Basking Ridge; Neeraj Saxena, Murray Hill, all of N.J.

[73] Assignee: The BOC Group, Inc., New Providence, N.J.

[21] Appl. No.: 678,921

[22] Filed: Jul. 12, 1996

[51] Int. Cl.$^6$ ........................................ F25J 3/00
[52] U.S. Cl. ........................ 62/617; 62/657; 62/908; 62/918
[58] Field of Search ................. 62/617, 657, 908, 62/909, 918

[56] References Cited

U.S. PATENT DOCUMENTS

| | | | |
|---|---|---|---|
| 4,373,942 | 2/1983 | Wright | 62/918 X |
| 4,972,676 | 11/1990 | Sakai | 62/657 |
| 5,220,796 | 6/1993 | Kearns | 62/908 X |
| 5,398,513 | 3/1995 | Klobucar | 62/908 X |
| 5,425,242 | 6/1995 | Dunne et al. | 62/908 X |
| 5,435,141 | 7/1995 | Rose et al. | 62/657 X |
| 5,481,881 | 1/1996 | Buet et al. | 62/657 X |

*Primary Examiner*—Christopher Kilner
*Attorney, Agent, or Firm*—Coleman R. Reap; Salvatore P. Pace

[57] ABSTRACT

A process for recovering a given component from a first gas stream in which the given component is intermittently present by PSA or TSA using an adsorbent which more strongly adsorbs the given component by introducing into the first gas stream, prior to PSA or TSA treatment, a second gas stream that is enriched in the given component. The second gas stream may be introduced into the first gas stream only during periods when the concentration of given component in the first gas stream is below its maximum concentration or it may be continuously introduced into the first gas stream at a level which is greater than the maximum concentration of given component originally present in the first gas stream.

13 Claims, 3 Drawing Sheets

FIG. 2A
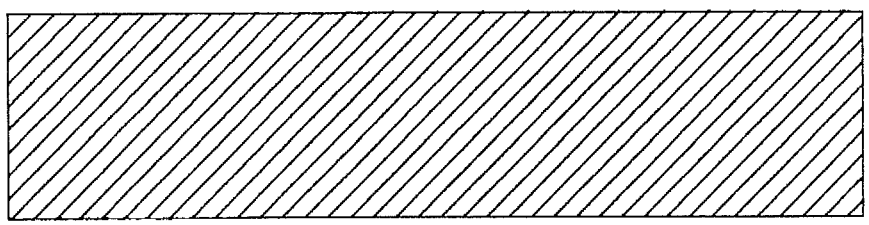
FIG. 2B
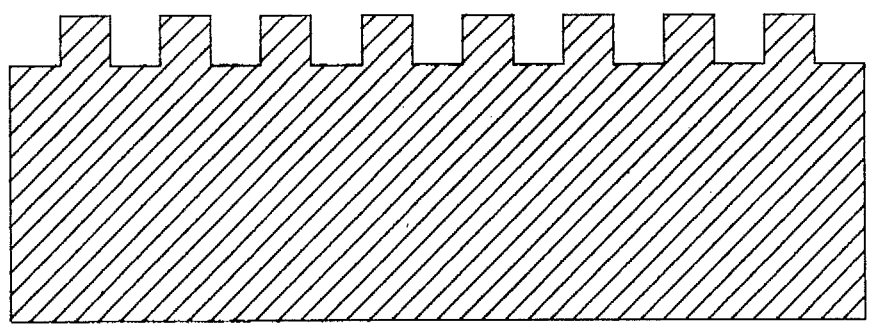
FIG. 2C
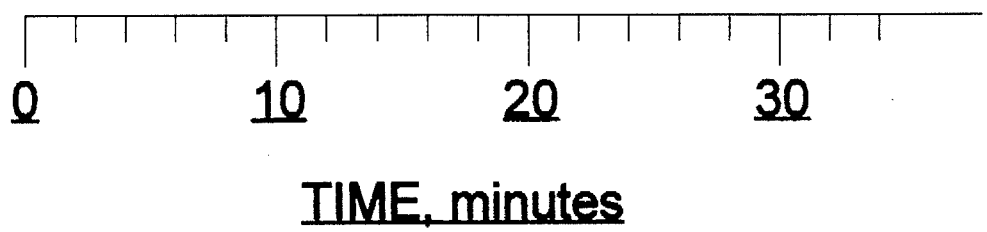
TIME, minutes

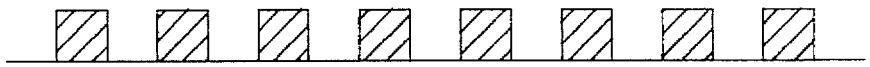
FIG. 3A
FIG. 3B
FIG. 3C
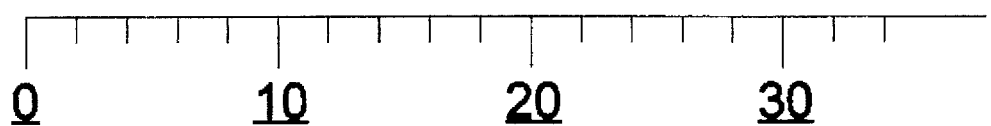
TIME, minutes

PROCESS FOR THE RECOVERY OF PERFLUORINATED COMPOUNDS

FIELD OF THE INVENTION

This invention relates to the recovery of components from a gas stream, and more particularly to the recovery of gaseous perfluorinated compounds from waste gas streams by pressure swing adsorption or temperature swing adsorption.

BACKGROUND OF THE INVENTION

Cyclic adsorption processes, such as pressure swing adsorption (PSA) and temperature swing adsorption (TSA) are efficient methods for separating the components of a gas mixture using a particulate adsorbent material which adsorbs one or more components of the gas mixture at elevated pressures and low temperatures more strongly than it adsorbs one or more other components of the gas mixture. The process is generally carried out in one or more elongate adsorbent-packed vessels having a feed gas inlet and a nonadsorbed gas outlet by a multi-step cycle which includes an adsorption step and a bed regeneration step. During the adsorption step the gas mixture is passed cocurrently through the bed (in the direction from the gas inlet toward the gas outlet). As the gas passes through the bed of adsorbent the more strongly adsorbed component is adsorbed while the less strongly adsorbed component passes through the bed. As the adsorption step proceeds, the strongly adsorbed component forms a front which gradually advances toward the outlet end of the bed. The adsorption step is terminated before the adsorbed gas front breaks through the bed of adsorbent, and the adsorbent then undergoes regeneration, during which the vessel is depressurized by the countercurrent discharge of the adsorbed gas from the vessel (PSA processes), or the adsorbent is heated sufficiently to cause desorption of the adsorbed components from the adsorbent (TSA). The process is usually practiced in two or more adsorption vessels operated out of phase such that the adsorbent in one vessel is in adsorption service while the adsorbent in another undergoes regeneration.

PSA and TSA processes are ideally suited to the separation of components of gas mixtures which contain relatively constant concentrations of the component being adsorbed. This is particularly important in cyclic adsorption processes carried out in multi-vessel systems, since constant concentration of strongly adsorbed component in the system feed gas is highly desirable or necessary for the attainment of steady state conditions, which makes it easier to produce a gas product of more uniform purity. Also, when the concentration of the strongly adsorbed gas component varies over a wide range it is difficult to avoid the occasional occurrence of breakthrough of strongly adsorbed component into the nonadsorbed product gas stream.

In certain chemical processes waste gas streams are generated and discharged from the reaction zone on a substantially continuous basis but certain components of the waste gas are only produced sporadically during the course of the processes. For example, some semiconductor fabrication processes use low molecular weight fluorinated compounds in combination with oxygen for etching of silicon chips and for cleaning residue from the chemical vapor deposition chambers. These processes are typically intermittently conducted under vacuum. The exhaust gas from the chamber contains, in addition to the fluorinated compounds, unreacted deposition compounds and a variety of reaction products, such as hydrogen fluoride, silanes, halides, etc. Since these compounds cannot be safely released to the atmosphere the exhaust gas is generally treated to destroy the potentially harmful compounds or convert them to compounds that can be released to the atmosphere.

According to one procedure, the deposition chamber exhaust gas is combined with an inert carrier gas, e.g. nitrogen, upstream of the vacuum pump used to evacuate the chamber, and mixture is introduced into a gas reactor column (GRC) such as the column manufactured by Edwards High Vacuum International Division of The BOC Group, plc under the trade designation EDWARDS GRC, wherein components of the stream are reacted at high temperatures and converted into disposable solid substances. Fluorinated compounds are highly nonreactive, however, and pass through the reactor unaffected, together with the inert carrier gas. The fluorinated compounds are recovered from the GRC waste gas by PSA or TSA using adsorbents which selectively adsorb fluorinated compounds. This process is described in U.S. Pat. No. 5,417,742, the text of which is incorporated herein by reference.

A problem encountered in the above described process results from the intermittent practice of the silicon chip etching or deposition steps and vapor deposition chamber cleaning steps. These are conducted on an alternating basis; accordingly, although nitrogen is continuously introduced into the waste gas stream from the chamber, the concentration of fluorinated compound in the waste gas stream is irregular because of the intermittent discharge of the perfluorocarbons from the vapor deposition chamber. These conditions make it very difficult to efficiently remove the fluorinated compounds from the waste gas stream by PSA or TSA.

Because of the low cost and high efficiency of PSA and TSA processes for recovering strongly adsorbed compounds from gas streams, improvements which permit these techniques to be used under diverse conditions are continuously sought. The present invention provides a procedure which makes it possible to efficiently and effectively separate, by a cyclic adsorption process, continuous flow gas mixtures which contain varying concentrations of strongly adsorbed components.

SUMMARY OF THE INVENTION

The invention comprises combining with the gas stream being treated, upstream of the adsorption system, a second gas stream that is enriched in the strongly adsorbed component. The second gas stream may be combined with the gas stream being treated during periods when the concentration of strongly adsorbed component in the gas stream being treated is below its greatest concentration and/or continuously.

According to a broad embodiment, the invention comprises a process for separating components of a feed gas comprised of a first component and a second component, wherein the concentration of the second component in the feed gas varies over time, by a cyclic adsorption process using an adsorbent which more strongly adsorbs the second component than the first component comprising the steps:

(a) passing the feed gas through a chamber containing the adsorbent at a selected pressure and temperature, thereby adsorbing the second component and producing a gas stream depleted in the second component;

(b) desorbing the second component from the adsorbent by reducing the pressure in the chamber or raising the temperature in the chamber or by reducing the pressure and raising the temperature in the chamber, thereby producing a gas stream enriched in the second component; and (c) modulating the concentration of second component in the feed gas by introducing supplemental second component into the feed gas.

In one preferred embodiment of the invention step (c) comprises introducing the supplemental second component into the feed gas during periods of the process when the concentration of second component in the feed gas is below the greatest concentration of second component in the feed gas.

In another preferred embodiment of the invention step (c) comprises continuously introducing the supplemental second component into the feed gas at a concentration greater than the greatest concentration of second component originally in the feed gas.

In preferred aspects of the above embodiments the cyclic adsorption process is pressure swing adsorption, temperature swing adsorption or combinations of these.

In another preferred embodiment of the invention step (c) comprises modulating the concentration of second component in the feed gas by introducing a stream enriched in the second component into the feed gas during periods of the process when the concentration of second component in the feed gas is below the average concentration of second component in the feed gas.

In another preferred aspect of the invention, the gas stream enriched in the second component in step (b) is further fractionated into a first fraction and a second fraction each of which has a greater concentration of second component than the greatest concentration of second component in said feed gas, and a portion of either the first fraction or the second fraction is used as the stream introduced into the feed gas during step (c).

In a specific embodiment of the invention, the second component is a gaseous fluorinated compound or a mixture of fluorinated compounds, and the process is particularly useful when the second component is a perfluorocarbon. In a preferred aspect of the embodiment in which the second component is a gaseous fluorinated compound, the gas stream enriched in the fluorinated compound in step (b) is chilled sufficiently to produce a fluorinated compound-enriched condensate, and the fluorinated compound-enriched condensate is cryogenically distilled to produce a fluorinated compound enriched bottoms product and a portion of the fluorinated compound-enriched bottoms product is used as the stream introduced into the feed gas curing step (c).

The process is particularly useful when the first component is primarily nitrogen, the second component is a fluorinated hydrocarbon, e.g. a perfluorocarbon and the feed gas is the exhaust stream from a semiconductor fabrication process. The adsorbent in this case may, for example, be selected from silicon-rich adsorbents of the FAU structure, silicon-rich adsorbents of the BEA structure, silicon-rich adsorbents of the MOR structure, carbon molecular sieves having a pore diameter of at least 4.5 Angstrom units, carbonized, sulfonated styrene-divinylbenzene copolymers, mesoporous silicates of the M41S structure class and mixtures of these, In another preferred aspect of the broad embodiment the gas introduced into the feed gas in step (c) is a portion of the gas stream produced in step (b).

BRIEF DESCRIPTION OF THE DRAWINGS

FIGS. 2A to 2C are schematic representations showing the flow of perfluorocarbon in various parts of the system illustrated in FIG. 1 during the process of the invention according to a first embodiment of the invention.

FIGS. 3A to 3C are schematic representations showing the flow of perfluorocarbon in various parts of the system illustrated in FIG. 1 during the process of the invention according to a second embodiment of the invention.

DETAILED DESCRIPTION OF THE INVENTION

Figure 1:
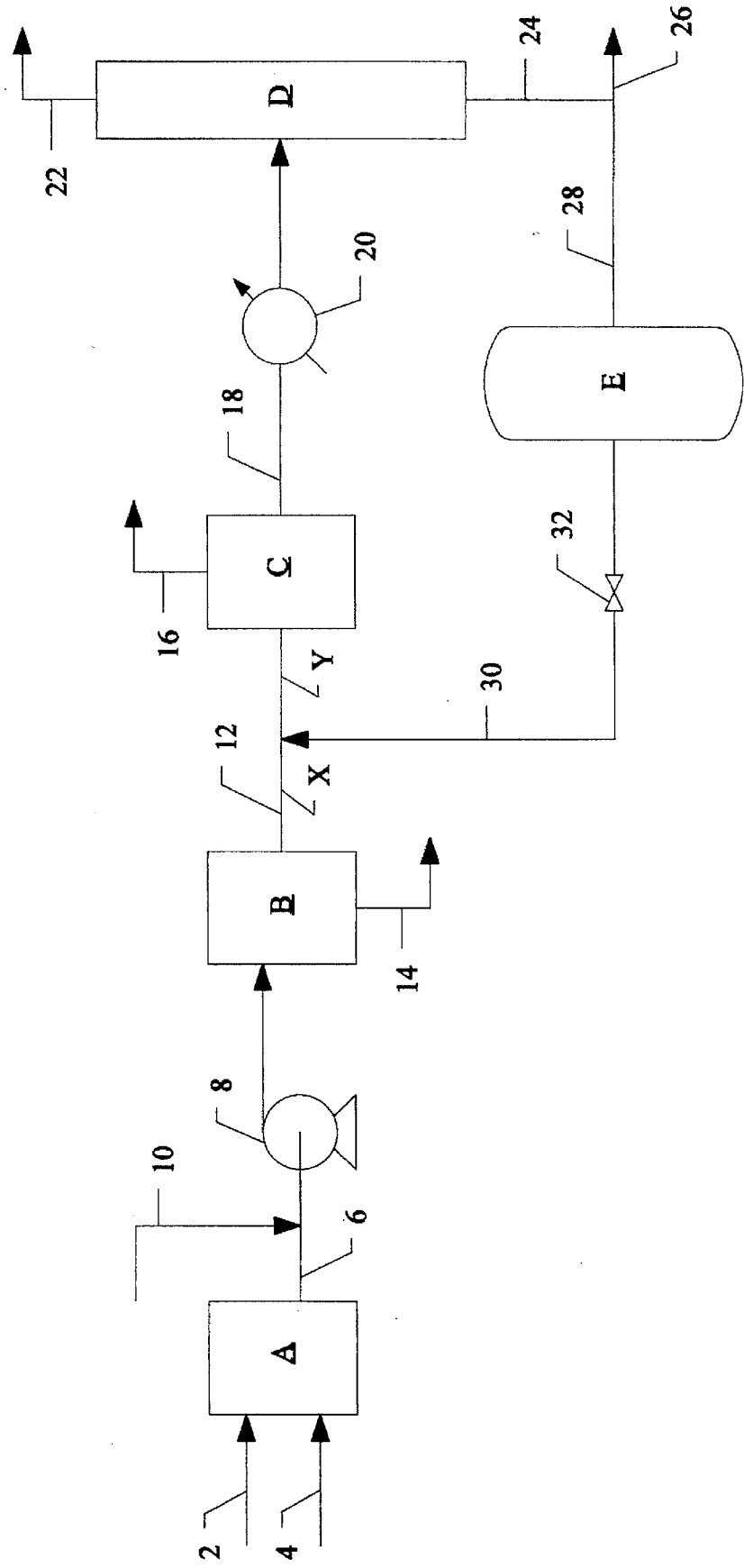
FIG. 1 illustrates, in a block diagram, a specific embodiment of a system for practicing the process of the invention wherein the fluorinated compound is a perfluorocarbon.

The process of the invention can be advantageously used in any cyclic adsorption process in which the strongly adsorbed component is present in the feed stream on an intermittent basis. Cyclic adsorption processes operate more efficiently when the concentration of strongly adsorbed component in the feed stream is constant because the system can readily reach a steady state condition. When the concentration of strongly adsorbed component in the feed to the adsorption vessel varies over a period of time, the system cannot achieve steady state operation The present invention serves to level out the concentration of strongly adsorbed component in the gas stream entering the adsorption vessel, thus making it possible for the system to quickly attain steady state operation and perform more reliably.

The invention is described in detail as it applies to the recovery of perfluorocarbons from the effluent from a semiconductor fabrication unit, however the invention is not limited to such a application and may be used to recover other strongly adsorbed compounds including other fluorinated compounds such as nitrogen trifluoride, sulfur hexafluoride, trifluoromethane, etc. In the perfluorocarbon recovery step of a semiconductor fabrication process, a perfluorocarbon is generally separated from one or more permanent gases such as nitrogen, oxygen, argon, helium, neon, krypton, xenon, hydrogen and carbon monoxide. The invention is particularly suitable for separating perfluorocarbons from nitrogen, oxygen, argon and mixtures of these.

The perfluorocarbons that can be separated by the process of the invention are those that are normally gaseous, i.e. gaseous at ambient temperature and atmospheric pressure, or that are vaporous at the temperature and pressure at which the adsorption step proceeds. The term "perfluorocarbon", as used in this specification, means aliphatic hydrocarbon derivatives in which all of the hydrogen atoms have been substituted with fluorine atoms. Included in this class of compounds are the saturated and ethylenically unsaturated perfluorocarbons having boiling points up to about 100° C., which includes perfluorocarbons containing up to 8 carbon atoms. Representative examples of perfluorocarbons that can be recovered by the process of the invention are perfluoromethane, perfluoroethane, perfluoropropane, perfluorohexane, perfluorooctane, perfluoroethylene, etc.

FIG. 1 illustrates one arrangement for applying the invention to the recovery of perfluorocarbons from the exhaust stream from a semiconductor manufacturing unit. Included in FIG. 1 are a semiconductor fabrication tool chamber, A, a gas reactor column, B, a gas separator plant, C, a distillation column, D, and a buffer tank, E. Tool chamber A, typically a vacuum vapor deposition or etching chamber or a battery of such chambers, is provided with perfluorocarbon feed line 2 and oxygen feed line 4. Tool chamber exhaust line 6 connects the gas outlet end of tool chamber A to the gas inlet of gas reaction chamber B. Located in line 6 is vacuum means 8, which is typically a vacuum pump. Inert gas supply line 10 connects a source of inert gas to line 6, upstream of vacuum means 8.

Reaction chamber B generally contains one or more agents which react with the components of the gaseous effluent from chamber A, and means for heating the reaction chamber to the desired reaction temperature (not shown). Gas reactor column B is provided with reactor column waste gas discharge line 12 and reactor column solids waste disposal line 14. Alternatively, the solids can be trapped in a throw away filter cartridge, which can be disposed of when filled. Alternatively, B may be any other processing unit or combination of units that is effective for recovering or eliminating components of the waste stream other than the perfluorocarbon. In the illustrated system, the downstream end of line 12 is connected to the inlet of gas separator C.

Various gas treatment units, such as filters or solvent wash scrubbers, may be located in the system between units B and C, if desired, to remove particulates and soluble components from the system, but these are not shown since they are not critical to the invention.

The principal purpose of unit C is to separate perfluorocarbons from the gaseous effluent from gas reactor column B. Unit C is typically a pressure swing or temperature swing adsorption system, preferably comprising two or more stationary beds packed with one or more adsorbents which selectively adsorb perfluorocarbons from the reactor effluent. The beds are generally arranged in parallel and adapted to be operated in a cyclic process comprising adsorption and desorption. It is commonplace to have the system in which the adsorption is carried out comprise two or more adsorbent beds cycled out of phase so that one or more adsorbent beds are being operated in the adsorption phase of the cycle while one or more other adsorption beds are being regenerated.

Separator C is provided with nonadsorbed gas discharge line 16 and desorbed gas discharge line 18. Located in desorbed gas discharge line 18 is cooler 20. Downstream of cooler 20, line 18 is joined to the feed inlet of distillation unit D. Unit D is a typical distillation column suitable for the cryogenic distillation of nitrogen from the waste gas, and it is equipped with overhead gas discharge line 22 and bottoms product discharge line 24. The downstream end of line 24 is joined to perfluorocarbon product gas discharge line 26 and recycle line 28. The downstream end of line 28 is connected to buffer tank E. Line 30 connects buffer tank E to line 12. Line 30 is provided with control valve 32.

The above-described equipment units are all conventional and details of their construction and operation form no part of this invention.

In practicing the process of the invention illustrated in the figure, perfluorocarbon and oxygen are introduced into tool chamber A, in which a chemical deposition or an etching operation has just been completed. Chamber A contains various waste deposits which are to be removed to prepare the chamber for the next chemical deposition or etching operation. The perfluorocarbon and oxygen contact the waste deposits and react with them to produce gaseous waste products. The gaseous products, together with unreacted perfluorocarbon and oxygen, are withdrawn from chamber A by suction created by vacuum means 8. Since the gaseous products and unreacted oxygen may form a flammable mixture, an inert gas, such as nitrogen, argon or carbon dioxide, is introduced into line 6 via line 10 to prevent premature combustion of the product gas. The inert gas, which also serves as a carrier gas for the intermittently discharged waste gas from chamber A, is continuously injected into line 6 to provide a continuous flow of feed gas to vacuum means 8.

The gas mixture passing through vacuum pump 8 is next introduced into gas reactor column B, wherein the mixture is heated to about 400° or higher. The various components of the mixture react to form gases that can be safely discharged to the environment or solid waste products that can be easily disposed of. The unreacted perfluorocarbons and inert gases pass through reactor B unaffected. The waste gas from reactor B next passes into separator C, wherein the perfluorocarbons are separated by adsorption from the other components of the gaseous effluent from reactor B.

The adsorbent used in the process of the invention can be any adsorbent material which preferentially adsorbs the intermittent gas component relative to the other gas components in the gas mixture being treated. When the process is used to recover perfluorocarbons from GRC gaseous effluent streams the adsorbent is preferably one of those described in above-mentioned U.S. Pat. No. 5,417,742.

The adsorption process comprises repeating adsorption and bed regeneration steps. In preferred embodiments the adsorption process is pressure swing adsorption, temperature swing adsorption or a combination of the two, the particular adsorption method being determined by the chemical composition of the process gas. The specific conditions under which the adsorption process is carried out determine the efficiency of the adsorption process, but they do not form a part of the invention. These conditions are well known to those familiar with gas adsorption processes and any combination of the widely varying operating conditions used in adsorption processes, may be employed in the process of the invention.

In general, the adsorption step is usually carried out at a temperature in the range of about $-100°$ C. or lower to about $+100°$ C. and an absolute pressure in the range of about 0.5 to about 20 bar, and is preferably carried out at a temperature in the range of about 15 to about 75° C. and an absolute pressure in the range of about 1 to about 10 bar. The lower the temperature, the better the separation performance of the adsorbent. During the adsorption step of the process, feed gas is introduced into the adsorption system and it flows through each bed that is in the adsorption phase of the cycle. As the gas flows through the bed perfluorocarbon is adsorbed onto the adsorbent. An adsorption front formed at the forward end of the adsorbed perfluorocarbon advances toward the nonadsorbed gas outlet as the adsorption step proceeds. The remainder of the gas stream passes through the bed and leaves separator C through line 16 as waste gas. The waste gas may be discharged into the atmosphere, if it is free of components that are harmful to the environment; otherwise, it may be sent to downstream units for further treatment. When the adsorption front reaches the desired point in the adsorption bed, flow of feed gas into the bed is terminated. This marks the end of the adsorption phase of the separation process.

The beds that have just completed the adsorption step next undergo regeneration. The conditions under which bed regeneration is carried out are likewise not critical to the successful practice of the invention. PSA bed regeneration can be carried out at an absolute pressure as low as about 100 millibar or lower, but it is usually carried out at an absolute pressure in the range of about 100 to about 1000 millibar. TSA bed regeneration is carried out by heating the adsorbent to a temperature above the temperature at which the adsorption step is carried out, typically a temperature in the range of about 0° to about 200° C., and preferably to a temperature in the range of about 20° to about 150° C. The desorption may be accomplished by means of heaters and/or by passing steam or a heated inert gas through the bed. During the regeneration step of a TSA cycle the pressure in the adsorption vessel can either remain the same as or be lower than the pressure maintained in the vessel during the adsorption step. It is often preferred to conduct temperature swing processes at or near atmospheric pressure. When combinations of pressure swing adsorption and temperature swing adsorption cycles are employed the temperature is higher and the pressure is lower during the bed regeneration step than they are during the adsorption step of the cycle.

During regeneration, a perfluorocarbon-rich product is desorbed from unit C through line 18. In the system illustrated in FIG. 1, the desorbed perfluorocarbon rich stream is cooled as it passes through cooler 20 and is then introduced into separation unit D, wherein the perfluorocarbons are further separated from the other components of the perfluorocarbon-rich gas stream. The lighter components of the gas stream, i.e. nitrogen, etc. are removed from unit D as an overhead product stream through line 22. This stream may be richer in perfluorocarbon than the gas stream passing from reactor B to separator C, in which case part or all of this stream can be pressurized and recycled to line 12 through line 28, as described below. If this gas stream contains little or no perfluorocarbon it may be discharged to the atmosphere or otherwise appropriately disposed of. Most of the bottoms product is discharged from the system through lines 24 and 26, and it can be sent to storage for reuse, if it is of suitable purity, or it can be subjected to further purification or disposed of.

A portion of the bottoms product passing through line 24 and/or all or a portion of the overhead product leaving column D through line 22 can be pressurized to the pressure of the gas entering separator C through line 12 by pressure buildup means (not shown) and stored in buffer tank E, which is not a necessary part of the system but is useful to provide a reliable source of supplemental perfluorocarbon gas for introduction into the feed stream to separator C.

As explained above, the principal purpose of the invention is to dampen or substantially offset the impact of the intermittent flow of perfluorocarbons on the operation of separator C. This can be accomplished by at least two embodiments. According to a first embodiment, valve 32 is maintained in the open position and gas is continuously recycled to separator C through line 30. In this embodiment, the quantity of perfluorocarbon recycled is sufficient to render negligible the quantity of perfluorocarbon in the effluent from reactor column B. In other words the total concentration of perfluorocarbon continuously fed to separator C in this embodiment is sufficiently high that the variation of perfluorocarbon concentration in the feed caused by the intermittent flow of perfluorocarbon from column B is insignificant with respect to operation of separator C and does not prevent steady state operation of separator C. This method has the advantage of being easier to manage since the flow of recycle gas is continuous.

FIGS. 2A to 2C illustrate a fragment of a run conducted according to the above-described first embodiment. These figures are graphic representations of flow of perfluorocarbon to separator C, with the cross-hatched sections representing periods during which perfluorocarbon flows to separator C. The height of the cross-hatched sections indicates the quantity of perfluorocarbon in the gas flowing through the indicated lines and the abscissa represents the passage of time (from left to right in the drawings). The time scale below FIG. 2C, which applies to each of FIGS. 2A to 2C, is subdivided into two minute intervals. The period of two minutes was arbitrarily selected for purposes of illustration. The interval can be any regular or irregular time period. FIG. 2A illustrates the flow of perfluorocarbon through line 12 upstream of the junction of lines 12 and 30. There is no perfluorocarbon in the gas stream during the first, third, fifth, etc. two minute period of the run, and there is perfluorocarbon in the gas stream during the second, fourth, sixth, etc. two minute period of the run. FIG. 2B represents the flow of perfluorocarbon in line 30 downstream of valve 32. Note that the quantity of perfluorocarbon being recycled through line 30 is constant and considerably greater than the quantity of perfluorocarbon flowing from reaction chamber B. FIG. 2C represents the flow of perfluorocarbon in line 12 downstream of the junction of lines 12 and 30. It can be seen that the intermittent component of the perfluorocarbon flow in FIG. 2C is small, relative to the overall flow of perfluorocarbon passing to separator C through line 12. Thus, operation of separator C can approach steady state much easier in the FIG. 2C case than in the FIG. 2A case.

According to the second embodiment perfluorocarbon gas is intermittently recycled to reactor C through line 30. In this embodiment, the flow of recycled gas is programmed to coincide with the flow of perfluorocarbon gas from reactor B in a manner that the concentration of perfluorocarbon in the mixed stream flowing to separator C through line 12 is substantially constant or quasi constant. This is accomplished by recycling perfluorocarbon through line 30 at times when the gas flowing through line 12 from reactor B contains reduced concentrations of perfluorocarbon. The advantage of this procedure is that less perfluorocarbon gas is recycled to separator C so that the operation of separator C is less costly.

FIGS. 3A to 3C illustrate a fragment of a run conducted according to the above-described second embodiment. The time scale below FIG. 3C, which applies to each of FIGS. 3A to 3C, is subdivided into two minute intervals, which again is an arbitrarily selected time period. As was the case with the FIG. 2 series of figures, FIG. 2A illustrates the flow of perfluorocarbon through line 12 upstream of the junction of lines 12 and 30; FIG. 3B represents the flow of perfluorocarbon in line 30 downstream of valve 32; and FIG. 3C represents the flow of perfluorocarbon in line 12 downstream of the junction of lines 12 and 30. The flow pattern of FIG. 3A is identical to that of FIG. 2A The flow pattern in the FIG. 3B is the mirror image of that in FIG. 3A, such that there is perfluorocarbon in the gas stream during the first, third, fifth, etc. two minute period of the run, and there is no perfluorocarbon in the gas stream during the second, fourth, sixth, etc. two minute period of the run. As shown in FIG. 3C, the flow of perfluorocarbon in line 30 (FIG. 3B) complements the flow of perfluorocarbon in line 12 (FIG. 3A), with the result that the flow and concentration of perfluorocarbon to separator C is substantially constant (FIG. 3C). Thus, as was the case in the FIG. 2C situation, operation of separator C can approach steady state much easier in the FIG. 3C case than in the FIG. 3A case.

The gas that is introduced into line 12 from line 30 can be the perfluorocarbon-rich bottoms product from distillation column D, as illustrated in the arrangement of FIG. 1, or it can be a perfluorocarbon-rich gas from any other source. For example, this gas can be a portion of the stream passing through line 18 downstream of separator C, or it can be a high purity perfluorocarbon obtained from storage. The only requirement is that it be provided in amounts and at times during the periods necessary to accomplish the goal of the invention, i.e. achieving steady state operation of separator C. Preferably, the supplemental gas introduced into line 12 through line 30 or from other sources has a greater concentration of perfluorocarbon than the feed stream entering separator C from reactor B. When this gas is a portion of the desorbed gas stream in line 18, it is preferable that the gas destined for recycle be accumulated in a buffer tank, for example vessel E, so that it will be available in the required amounts and when needed.

Modifications of the above embodiments are contemplated. For example, The first and second embodiments can be combined to provide a substantially continuous flow of perfluorocarbon at an increased flow rate. Furthermore, the invention can be used to advantage when the concentration of perfluorocarbon in the effluent from chamber A is not the same during each interval when perfluorocarbon flows out of chamber A and/or when the time intervals during which perfluorocarbon leaves chamber A are not of the same duration. In these cases the duration and rate of recycle of perfluorocarbon can be tailored to provide the above-discussed advantages of the invention.

It will be appreciated that it is within the scope of the present invention to utilize conventional equipment to monitor and automatically regulate the flow of gases within the system so that it can be fully automated to run continuously in an efficient manner.

The invention is further illustrated by the following computer-generated hypothetical example in which, unless otherwise indicated, parts, percentages and ratios are on a molar basis, and the flow rate is expressed as standard liters per minute (slpm).

EXAMPLE 1

This example illustrates practice of the invention in a system similar to the portion of the system of FIG. 1 beginning at point X in line 12, upstream of the junction of lines 12 and 30. The gas stream flowing through line 12 at point X comprises nitrogen, oxygen and perfluoroethane. The nitrogen flows through line 12 continuously while the flow of oxygen and perfluoroethane follows the pattern illustrated in FIG. 3A, with the time periods delineated by the segments in FIG. 3A being of 1.5 minute duration and with the oxygen and perfluoroethane flowing past point X only during the periods represented by the crosshatched rectangles in FIG. 3A. The concentration of perfluoroethane flowing past point X in line 12 is represented by the height of the rectangles in FIG. 3A.

The gas flowing through line 30 is substantially pure perfluoroethane, recovered from the bottom of column D. The flow of perfluoroethane through line 30 is represented by the pattern illustrated in FIG. 3B, with the time segments also being of 1.5 minute duration and the concentration of perfluoroethane being represented by the height of the rectangles in FIG. 3B, this height being the same as the height of the rectangles in FIG. 3A. Flow of perfluoroethane through line 30 is out of phase with the flow of oxygen and perfluoroethane past point X in line 12, i.e. perfluoroethane flows through line 30 only during those periods when no perfluoroethane flows past point X in line 12.

The flow of perfluoroethane through line 12 downstream of its junction with line 30 (at point Y) is represented by the pattern illustrated in FIG. 3C. The combination of the flow of perfluoroethane past point X in line 12 and that in line 30 provide a substantially continuous flow of perfluoroethane at a substantially constant concentration at point Y in line 12.

In the example, separator C is an adsorption plant containing dealuminated type Y zeolite, sold by Degussa AG under the trade designation Degussa Wessalith DAY as the adsorbent and operated on a PSA cycle with the adsorption pressure being about 3.8 bara and the desorption pressure being about 100 mbara. Also, cooler 20 is a vented cooling condenser. The recovery of perfluoroethane in separator C is projected to be about 94%.

The flow rates of selected streams in the system during a cycle of the process of this example are tabulated in the Table. One cycle is of three minute duration. The cycle is repeated continuously.

TABLE

| | | Flow Rates, slpm | | | |
|---|---|---|---|---|---|
| Stream | Time Period, min | Perfluoroethane | Oxygen | Nitrogen | Total |
| Line 12, Pt. a | 0–1.5 | 0.5 | 0.5 | 40.0 | 41.0 |
| | 1.5–3.0 | 0.0 | 0.0 | 40.0 | 40.0 |
| Line 30 | 0–1.5 | 0.0 | 0.0 | 0.0 | 0.0 |
| | 1.5–3.0 | 0.5 | 0.0 | 0.0 | 0.5 |
| Line 12, Pt. b | 0–1.5 | 0.5 | 0.5 | 40.0 | 41.0 |
| | 1.5–3.0 | 0.0 | 0.0 | 40.0 | 40.5 |
| Line 16 | 0–1.5 | 0.03 | 0.43 | 34.0 | 34.46 |
| | 1.5–3.0 | 0.03 | 0.0 | 34.0 | 34.03 |
| Line 18 | 0–1.5 | 0.47 | 0.07 | 6.0 | 6.52 |
| | 1.5–3.0 | 0.47 | 0.0 | 6.0 | 6.52 |

About 80% of the perfluoroethane leaving reactor B is recovered in this example, in which the system is operated without recycle of the nonadsorbed gas product from separator C or the overhead product from distillation unit D. perfluoroethane recovery can be enhanced by recycling part of one or both of these streams.

This example illustrates the use of the invention to provide a smooth, steady-state operation of an adsorption-based recovery system in which the feed to the adsorption unit contains a strongly adsorbed component and a weakly adsorbed component and wherein the strongly absorbed component is present in the feed on an intermittent basis.

Although the invention has been described with particular reference to specific equipment arrangements and to specific gas separations, these features are merely exemplary of the invention and variations are contemplated. For example, the process of the invention can be used to recover other strongly adsorbed gases from gas mixtures in which the strongly adsorbed gas in present on an intermittent basis. The scope of the invention is limited only by the breadth of the appended claims.

What is claimed is:

1. A process for separating components of a feed gas comprised of a first component and a second component, wherein the concentration of said second component in said feed gas varies over time, by a cyclic adsorption process using an adsorbent which more strongly adsorbs said second component than said first component comprising the steps:

(a) passing the feed gas through a chamber containing said adsorbent at a selected pressure and temperature, thereby adsorbing said second component and producing a gas stream depleted in said second component;

(b) desorbing said second component from said adsorbent by reducing the pressure in said chamber or raising the temperature in said chamber or by reducing the pressure and raising the temperature in said chamber, thereby producing a gas stream enriched in said second component; and (c) modulating the concentration of second component in said feed gas by introducing supplemental second component into said feed gas.

2. The process of claim 1, wherein step (c) comprises introducing said supplemental second component into said feed gas during periods of the process when the concentration of second component in said feed gas is below the greatest concentration of second component in said feed gas.

3. The process of claim 1, wherein step (c) comprises continuously introducing said supplemental second component into said feed gas at a concentration greater than the greatest concentration of second component originally present in said feed gas.

4. The process of any one of claims 1 to 3, wherein said cyclic adsorption process is pressure swing adsorption, temperature swing adsorption or combinations of these.

5. The process of claim 2, wherein step (c) comprises modulating the concentration of second component in said feed gas by introducing a stream enriched in said second component into said feed gas during periods of the process when the concentration of second component in said feed gas is below the average concentration of second component in said feed gas.

6. The process of claim 4, wherein said second component is a gaseous perfluorinated compound.

7. The process of claim 6, wherein said second component is a perfluorocarbon.

8. The process of claim 7, wherein said first component is nitrogen and said feed gas is the exhaust stream from a semiconductor fabrication process.

9. The process of claim 8, wherein said adsorbent is selected from silicon-rich adsorbents of the FAU structure, silicon-rich adsorbents of the BEA structure, silicon-rich adsorbents of the MOR structure, carbon molecular sieves having a pore diameter of at least 4.5 Angstrom units, carbonized, sulfonated styrene-divinylbenzene copolymers, mesoporous silicates of the M41S structure class and mixtures of these.

10. The process of claim 1, wherein said gas introduced into said feed gas in step (c) is a portion of the gas stream produced in step (b).

11. The process of claim 1, wherein the gas stream enriched in said second component produced in step (b) is further separated into a first fraction and a second fraction each of which has a greater concentration of second component than the greatest concentration of second component in said feed gas, and part of said first fraction or part or all of said second fraction is used as the stream introduced into said feed gas during step (c).

12. The process of claim 1, wherein the gas stream enriched in said second component produced in step (b) is further separated into a first fraction and a second fraction each of which has a greater concentration of second component than the greatest concentration of second component in said feed gas, and part of said first fraction and part or all of said second fraction is used as the stream introduced into said feed gas during step (c).

13. The process of claim 8, wherein the gas stream enriched in said second component produced in step (b) is chilled sufficiently to produce a perfluorocarbon-enriched condensate, and said perfluorocarbon-enriched condensate is cryogenically distilled to produce a perfluorocarbon enriched bottoms product and a portion of said perfluorocarbon-enriched bottoms product is used as the stream introduced into said feed gas during step (c).

* * * * *